(12) United States Patent
Adam et al.

(10) Patent No.: US 7,989,504 B2
(45) Date of Patent: Aug. 2, 2011

(54) CHEMOMECHANICAL PRODUCTION OF FUNCTIONAL COLLOIDS

(75) Inventors: Jens Adam, Saarbrücken (DE); Kai Gossmann, Saarbrücken (DE); Helmut Schmidt, Saarbrücken (DE); Karl-Peter Schmitt, Grosbliederstrof (FR); Frank Tabellion, Saarbrücken (DE)

(73) Assignee: Buhler Partec GmbH, Saarbrucken (DE)

( * ) Notice: Subject to any disclaimer, the term of this patent is extended or adjusted under 35 U.S.C. 154(b) by 738 days.

(21) Appl. No.: 10/544,003

(22) PCT Filed: Feb. 6, 2004

(86) PCT No.: PCT/EP2004/001121
§ 371 (c)(1),
(2), (4) Date: Jul. 29, 2005

(87) PCT Pub. No.: WO2004/069400
PCT Pub. Date: Aug. 19, 2004

(65) Prior Publication Data
US 2006/0194886 A1    Aug. 31, 2006

(30) Foreign Application Priority Data
Feb. 6, 2003 (DE) .................................. 103 04 849

(51) Int. Cl.
*B01F 3/12* (2006.01)
*B02C 23/18* (2006.01)
*B02C 23/06* (2006.01)
*B02C 19/18* (2006.01)
*C04B 35/486* (2006.01)
*C04B 35/111* (2006.01)

(52) U.S. Cl. ............... 516/34; 241/15; 241/16; 241/22; 427/220; 977/776; 516/924; 516/928

(58) Field of Classification Search ............... 516/34, 516/924, 928; 241/15, 16, 22; 427/220; 977/776
See application file for complete search history.

(56) References Cited

U.S. PATENT DOCUMENTS

| | | | | |
|---|---|---|---|---|
| 4,735,770 A * | 4/1988 | Schultz et al. | ............... | 148/513 |
| 5,065,946 A * | 11/1991 | Nishida et al. | ............... | 241/16 |
| 5,122,317 A * | 6/1992 | Chen et al. | ............... | 264/651 |
| 5,246,173 A * | 9/1993 | Steidl | ............... | 241/30 |
| 5,342,744 A * | 8/1994 | Wariishi | ............... | 430/522 |
| 5,474,237 A * | 12/1995 | Bishop et al. | ............... | 241/21 |
| 5,593,781 A * | 1/1997 | Nass et al. | ............... | 428/403 |
| 5,609,907 A | 3/1997 | Natan | | |
| 6,533,966 B1 * | 3/2003 | Nonninger et al. | ......... | 252/520.1 |
| 6,558,807 B2 * | 5/2003 | Ito et al. | ............... | 428/472 |
| 6,855,396 B1 | 2/2005 | Mennig et al. | | |
| 7,022,305 B2 * | 4/2006 | Drumm et al. | ............... | 423/625 |
| 2001/0009942 A1 * | 7/2001 | Murata et al. | ............... | 524/417 |
| 2003/0098529 A1 | 5/2003 | Drumm et al. | | |
| 2003/0109588 A1 * | 6/2003 | Schmidt et al. | ............... | 516/20 |

FOREIGN PATENT DOCUMENTS

| | | |
|---|---|---|
| DE | 421318 | 11/1925 |
| DE | 198 40 527 A1 | 3/2000 |
| DE | 198 49 048 A1 | 4/2000 |
| DE | 199 52 040 A1 | 5/2001 |
| JP | 62087237 A | 4/1987 |
| JP | 63120758 A | 5/1988 |
| JP | 2194065 A | 7/1990 |
| JP | 4198278 A | 7/1992 |
| JP | 5239377 A | 9/1993 |
| JP | 6279017 A | 8/1994 |
| JP | 6329948 A | 11/1994 |
| JP | 8104606 A | 4/1996 |
| JP | 8176460 A | 7/1996 |
| JP | 9143448 A | 6/1997 |
| JP | 9511481 T | 11/1997 |
| JP | 2001106939 A | 4/2001 |
| JP | 2001234091 A | 8/2001 |
| WO | WO 93/21127 | 10/1993 |
| WO | WO 00/14017 A1 * | 3/2000 |
| WO | 02/08124 A2 | 1/2002 |

* cited by examiner

*Primary Examiner* — Daniel S Metzmaier
(74) *Attorney, Agent, or Firm* — Bachman & LaPointe, P.C.

(57) ABSTRACT

A method for producing a functional colloid during which particles are reactively fragmented in a mechanical manner in a dispersant in the presence of a modifying agent so that the modifying agent is chemically bound, at least in part, to the fragmented colloid particles.

10 Claims, No Drawings

CHEMOMECHANICAL PRODUCTION OF FUNCTIONAL COLLOIDS

BACKGROUND OF THE INVENTION

This invention relates to functional colloids and a method for their manufacture.

Colloids have been known for a long time. They can arise, for example, via sol-gel technique, or in natural processes, such as in bodies of water and during condensation processes in the gas phase. It is typical for such colloids that they are only stable in an aqueous solution if prevented from aggregating via stabilizing factors. Aggregation can be initiated through interactions between the colloid particles, e.g., via van-der-Waals forces, hydrogen bridges, hydrophobic interactions, dipole-dipole-interactions or chemical bonds. Given the extremely large surface, the tendency toward aggregation is particularly great. Colloidal particle normally have dimensions not exceeding 0.2 μm.

In general, colloid stabilization takes place via a corresponding zeta potential, i.e., the formation of a dual charge cloud around the colloid. This can be caused by a varying electron affinity, or a charging of particles with ions or electrons, e.g., by setting the pH value. However, it can also take place via the agglomeration of specific molecules on the surface, e.g., via the agglomeration of humic acid in natural bodies of water. However, all of these processes assume that the colloids have been generated by a preceding reaction, and that conditions leading to such a stabilization have been established in the environment of the colloid.

While other methods for manufacturing small particles, e.g., high-energy milling, shatter the crystalline structure down to nanoscale proportions, they cannot prevent subsequent aggregation. Such aggregated particles, which are in part also manufactured via targeted condensation from gas phases, can only be deaggregated under specific conditions. For example, metal particles have been successfully dispersed in oil, since the oil can shift between weakly interacting metal surfaces. However, weakly interacting metal surfaces are only obtained if the metal particles are fabricated in a high vacuum, i.e., under ultra-pure conditions, so that no oxide surface is formed. If this is not the case, it becomes practically impossible to disperse the particles any longer. In the aforementioned high-energy milling process, a redispersion to primary crystallite size is hence no longer possible.

As shown above for metal particles redispersible in oil, such systems can only be controlled from a process standpoint in exceptional cases. Process control requires a method that sets the colloid particles during manufacture in such a way that they satisfy the respective process-related requirements. In this way, it would be possible to impart the desired properties or functions to the colloid particles during manufacture. For example, it would be possible to stabilize, compatibilize, intertize or reactivate the colloid particles relative to the environment.

Commercially available milling aggregates commonly only make it possible to obtain particles in the submicrometer range, and even that only with so-called milling aids, which prevent freshly generated fractured surfaces from recombining again. Comminution to colloidal dimensions, in particular to a range of 0.002 to 0.05 μm, is generally not possible.

The object according to the invention was now to fabricate colloids that exhibit an outstanding stability relative to aggregation, wherein the colloid particles can be extremely small (preferably under 0.2 μm, in particular under 0.05 μm), and the properties or functions of the colloid or colloid particles can be adjusted to the respective requirements.

SUMMARY OF THE INVENTION

The object according to the invention is achieved by using a chemomechanical reactive comminution process to realize a functionalization, accompanied simultaneously by stabilization relative to an aggregation of the obtained colloid particles.

DETAILED DESCRIPTION

Accordingly, this invention provides a method for the chemomechanical manufacture of a functional colloid, in which particles are subjected to mechanical reactive comminution in a dispersant in the presence of a modifying agent, so that the modifying agent is at least partially chemically bound to the comminuted colloid particles.

According to the invention, generally low-molecular modifying agents that can enter into a chemical bond with the particles are used in milling aggregates or other dispersing aggregates to generate functional colloids out of particles, which exhibit molecular residues of the modifying agent rigidly bound with the surface of the particles as functional groups, wherein the average smallest dimension of the functionalized particles can extend as far down to 0.01 and even 0.002 μm, if needed. The method according to the invention makes it possible to obtain stable colloids with average smallest dimensions preferably not exceeding 0.2 μm from coarse-grained particles. Modifying the colloid particles with comparatively small molecules that can rapidly diffuse on the newly formed surfaces prevents or inhibits an aggregation, while at the same time resulting in a functionalization of the colloid or colloid particles tailored to the respective requirements.

The used particles are solid particles made out of any suitable material. For example, they can be organic (or polymer) or inorganic particles, wherein inorganic particles are preferred. Examples of inorganic particles include particles consisting of an element, an alloy or an element compound. The inorganic particles preferably consist of metals, alloys and in particular of metal compounds and semiconductor element compounds, e.g., Si or Ge, or boron.

Examples for particles from an element are particles from carbon, like soot or activated charcoal, from a semiconductor, like silicon (including industrial Si, ferrosilicon and pure silicon) or germanium or a metal such as iron (also steel), chromium, tin, copper, aluminum, titanium, gold and zinc. Examples of particles from an alloy include particles from bronze or brass.

Examples for preferred metal compounds and compounds of semiconductor elements or boron include (if necessary, hydratized) oxides, such as $ZnO$, $CdO$, $SiO_2$, $GeO_2$, $TiO_2$, $ZrO_2$, $CeO_2$, $SnO_2$, $Al_2O_3$ (in all modifications, in particular as a corundum, bomite, AlO(OH), also as aluminum hydroxide), $In_2O_3$, $La_2O_3$, $Fe_2O_3$, $Cu_2O$, $Ta_2O_5$, $Nb_2O_5$, $V_2O_5$, $MoO_3$ or $WO_3$, corresponding mixed oxides, e.g., indium tin oxide (ITO), antimony-tin oxide (ATO), fluorine-doped tine oxide (FTO) and those with a perowskite structure, such as $BaTiO_3$ and $PbTiO_3$, chalcogenides, for example sulfides (e.g., CdS, ZnS, PbS and $Ag_2S$), selenides (e.g., GaSe, CdSe and ZnSe) and tellurides (e.g., ZnTe or CdTe), halogenides, such as AgCl, AgBr, AgI, CuCl, CuBr, $CdI_2$ and $PbI_2$, carbides, such as $CdC2$ or SiC, silicides, such as $MoSi_2$, arsenides, such as AlAs, GaAs and GeAs, antimonides, such as InSb, nitrides, such as BN, AlN, $Si_3N_4$ and $Ti_3N_4$, phosphides, such as GaP, InP, $Zn_3P_2$ and $Cd_3P_2$, as well as carbonates, sulfates, phosphates, silicates, zirconates, aluminates and stannates of elements, in particular of metals or Si., e.g., carbonates of calcium and/or magnesium, silicates, such as alkali silicates, talcum, clays(kaolin) or mica, and sulfates of barium or calcium. Other examples of expedient particles include magnetite, maghemite, spinelles (e.g., $MgO.Al_2O_3$), mullite, eskolaite, tialite, $SiO_2.TiO_2$, or bioceramics, e.g., calcium phosphate and hydroxyapatite. They can also be particles made of glass or ceramics.

They can also be particles that are usually used to manufacture glass (e.g., borosilicate glass, soda-lime glass or silica glass), glass ceramics or ceramics (e.g., based on the oxides $SiO_2$, $BeO$, $Al_2O_3$, $ZrO_2$ or $MgO$ or the corresponding mixed oxides, electro- and magnetoceramics, such as titanates and ferrites, or non-oxide ceramics, such as silicon nitride, silicon carbide, boronitride or borocarbide). The particles can also serve as fillers or pigments. Technically important fillers include fillers based on $SiO_2$, such as quartz, cristobalite, tripolite, novaculite, diatomite, silica, pyrogenic silicic acids, precipitated silicic acids and silica gels, silicates, such as talcum, pyrophyllite, kaolin, mica, muscovite, phlogopite, vermiculite, wollastonite and perlite, carbonates, such as calcites, dolomites, chalk and synthetic calcium carbonates, soot, sulfates, such as light spar and heavy spar, iron mica, glasses, aluminum hydroxides, aluminum oxides and titanium dioxide.

Mixtures of these particles can also be used. Especially preferred materials for the particles are metal oxides, silicon oxides and silicates, in particular talcum, $ZrO_2$, $Al_2O_3$, $TiO_2$ and $SiO_2$ or mixtures thereof.

The particles used according to the invention can be manufactured in a conventional manner, e.g., via flame pyrolysis, plasma procedures, gas-phase condensation procedures, colloid techniques, precipitation procedures, sol-gel processes, controlled nucleation and growth processes, MOCVD processes and (micro)emulsion procedures. These methods are extensively described in the literature. In particular, use can be made of metals (e.g., after the reduction of the precipitation procedure), ceramic oxide systems (via deposition from solution), along with salt-like systems or multi-component systems.

The useable particles are generally frequently available on the market as well. Examples of $SiO_2$ particles include commercially available silicic acid products, e.g., silica sols, such as Levasile®, silica sols from Bayer AG, or pyrogenic silicic acids, e.g., the Aerosil® products from Degussa. Of course, all particles to be used as fillers can normally be procured on the market.

The particles can be used in the form of a powder or directly as a dispersion in a dispersant. The particles can also be obtained in the dispersant via the deposition of a dissolved prestage in situ.

The particle size of the used particles generally exceeds that of the colloid particles obtained via the method according to the invention. Even though the particle size of the used particles can be selected as desired, particles with an average particle diameter of less than 100 µm, preferably less than 10 µm, and an average particle diameter exceeding 0.001 µm, preferably exceeding 0.01 µm, are expedient.

The dispersant can be any solvent desired, provided it does not or essentially does not dissolve the particles to be treated, and is also inert or essentially inert relative to the used modifying agent. The suitable dispersant is preferably selected form water or organic solvents, depending on the particles to be treated, but inorganic solvents are also possible, such as carbon disulfide.

One particularly preferred dispersant is water, e.g., deionized water. Suitable organic dispersants include both polar and nonpolar and aprotic solvents. Examples include alcohols, e.g., aliphatic and alicyclic alcohols with 1 to 8 carbon atoms (in particular methanol, ethanol, n- and i-propanol, butanol, octanol, cyclohexanol), ketones, e.g., aliphatic and alicyclic ketones with 1 to 8 carbon atoms (in particular acetone, butanone and cyclohexanone), etsters, e.g., acetic acid ethyl esters and glycol esters, ethers, e.g., diethyl ether, dibutyl ether, anisol, dioxane, tetrahydrofurane and tetrahydropyrane, glycol ethers, such as mono, di, tri and polyglycol ethers, glycols, such as ethylene glycol, diethylene glycol and propylene glycol, amides and other nitrogen compounds, e.g., dimethyl acetamide, dimethyl formamide, pyridine, N-methylpyrrolidine and acetonitrile, sulfoxides and sulfones, e.g., sulfolan and dimethyl sulfoxide, nitro compounds, such as nitrobenzene, halogen hydrocarbons, such as dichloromethane, chloroform, tetrachlorocarbon, tri, tetrachloroethene, ethylene chloride, chlorofluorocarbons, aliphatic, alicyclic or aromatic hydrocarbons, e.g., with 5 to 15 carbon atoms, e.g., pentane, hexane, heptane and octane, cyclohexane, benzine, petroleum ether, methylcyclohexane, decalin, terpene solvents, benzene, toluene and xylenes. Of course, mixtures of such dispersants can also be used.

Preferably used organic dispersants include aliphatic and alicyclic alcohols, such as n- and i-propanol, glycols, such as ethylene glycol, and aliphatic, alicyclic and aromatic hydrocarbons, such as hexane, heptane, toluene and o-, m- and p-xylene. Particularly preferred dispersants are ethanol and toluene.

The particles are subjected to mechanical reactive comminution in the dispersant in the presence of a modifying agent, i.e., mechanical comminution is accompanied by a chemical binding of the modifying agent to the particles or comminuted particles in a chemical reaction. Such a reaction under a mechanical load is also referred to as a chemomechanical reaction. As known to the expert, the surface of particles usually has groups that cannot be found in this form inside the particles. These surface groups usually involve functional groups, which are generally relatively reactive. For example, such particles have surface groups like residual valences, e.g., hydroxy groups and oxy groups, e.g., in the case of metal oxide particles, or thiol groups and thio groups, e.g., in the case of metal sulfides, or amino-, amide- and imide groups, e.g., in the case of nitrides.

In particular, the modifying agent has a functional group that can enter into a chemical bond with the surface groups of the particles, at least under conditions of mechanical comminution. The chemical bond preferably involves a covalent, ionic or a coordinative bond between the modifying agent and the particle, but can also be hydrogen bridge bonds. Coordinative bonds are understood to a complex formation. For example, an acid/base reaction according to Brönsted or Lewis, complex formation or esterification can take place between the functional groups of the modifying agent and the particles.

The functional group encompasses the modifying agent, and preferably involves carbonic acid groups, acid chloride groups, ester groups, nitrile and isonitrile groups, OH groups, SH groups, epoxide groups, anhydride groups, acid amide groups, primary, secondary and tertiary amino groups, Si—OH groups, hydrolysable residues of silanes (the following described Si—OR groups) or C—H acid groupings, as in β-dicarbonyl compounds.

The modifying agent can also encompass more than one such functional group, e.g., in betaines, amino acids, EDTA.

In one variant of the method according to the invention, the used modifying agent can simultaneously also serve as a dispersant, so that the same bond can be used for both.

The modifying agents are not surfactants. This means that the modifying agent in the solvent used as the dispersant is unable to form micelles, even when used in high concentrations. The modifying agent used according to the invention, which differs from a surfactant, dissolves homogeneously in the solvent used as the dispersant. The modifying agents then are present as discrete molecules or molecule ions, homogeneously distributed in the solution. By contrast, surfactants in a solvent accumulate at an interface at a low concentration, lower the interfacial tension, and at high concentrations form micelles, meaning that they are heterogeneously distributed. The above information relates to the behavior in a pure dispersant. In the presence of particles, the modifying agents naturally enter into the chemical interactions with the particles as described in the invention.

While the modifying agents at least in part enter into covalent, ionic or coordinative chemical bonds with the surface groups of the particles as indicated above, the interactions of surfactants are generally less specific, e.g., typically involve adsorption or wetting interactions.

In addition to the at least one functional group that can enter into a chemical bond with the surface group of the particle, the modifying agent generally has a molecular residue, which modifies the properties of the particle after linking the modifying agent via the functional group. The molecular residue, or a portion thereof, can be hydrophobic or hydrophilic, for example, or carry a second functional group, so as to in this way functionalize the colloid particles relative to the environment, i.e., e.g., stabilize, compatibilize, intertize or reactivate. In this way, the colloid particles obtained according to the invention are provided by this molecular residue with a function or surface functionalization. In this sense, the colloids from the colloid particles modified with the modifying agent or surface modifying agent involve functional colloids. The invention makes it possible to obtain functional colloids tailored to the desired application. Depending on the system, covalent bonds, ionic bonds and complex bonds can be present as principles for coupling to the particles, while hydrogen bridge bonds are also suitable.

Hydrophobic molecular residues can include alkyl, aryl, alkaryl, aralkyl or fluorine-containing alkyl groups, which can lead to intertization or rejection given a suitable environment. Examples for hydrophilic groups would be hydroxy-, alkoxy- or polyether groups. If present, the second functional group of the modifying agent can be an acid, base or ionic group. It can also be a functional group suitable for a chemical reaction with a selected reactant. Since the second functional group can be the same as the one also suitable as a functional group for binding to the particle, reference is made to the examples cited there. Other examples for a second functional group include epoxide, acryloxy-, methacryloxy-, acrylate or methacrylate groups. There can be two or more identical or different functional groups of this kind.

The modifying agent preferably has a molecular weight not exceeding 500, more preferably not exceeding 400, and especially not exceeding 200. The bonds are preferably liquid under normal conditions. The functional groups that carry these bonds primarily depend on the surface groups of the solid particles and the desired interaction with the environment. The molecular weight also plays an important role with respect to diffusion on the freshly formed particle surfaces. Small molecules result in a rapid occupation of the surface, thereby preventing recombination.

Hence, examples of suitable modifying agents include saturated or unsaturated mono- and polycarbonic acids, the corresponding acid anhydrides, acid chlorides, esters and acid amides, amino acids, imines, nitriles, isonitriles, epoxy compounds, mono- and polyamines, β-dicarbonyl compounds, silanes and metal compounds, which have a functional group that can interact with the surface groups of the particles. Particularly preferred modifying agents include silanes, carbonic acids, amino acids and amines. The carbon chains of these compounds can be interrupted by O-, S- or NH-groups. One or more modifying agents can be used.

Preferred saturated or unsaturated mono- and polycarbonic acids (preferably monocarbonic acids) are ones with 1 to 24 carbon atoms, e.g., formic acid, acetic acid, propionic acid, butyric acid, valeric acid, caproic acid, acrylic acid, methacrylic acid, crotonic acid, citric acid, adipic acid, succinic acid, glutaric acid, oxalic acid, maleic acid, fumaric acid, itoconic acid and stearic acid, as well as the corresponding acid hydrides, chlorides, esters and amides, e.g., caprolactam. The aforementioned carbonic acids also encompass those whose carbon chains are interrupted by O-, S- or NH-groups. Especially preferred are ether carbonic acids, such as mono- and polyether carbonic acids, as well as the corresponding acid hydrides, chlorides, esters and amides, e.g., methoxyacetic acid, 3,6-dioxaheptanic acid and 3,6,9-trioxadecanic acid.

Examples of preferred mono- and polyamines are those with the general formula $Q_{3-n}NHn$, wherein n=0, 1 or 2, and the residues Q independently represent alkyl with 1 to 12, in particular 1 to 6, and especially preferred 1 to 4 carbon atoms, e.g., methyl, ethyl, n- and i-propyl and butyl, as well as aryl, alkaryl or aralkyl with 6 to 24 carbon atoms, e.g., phenyl, naphthyl, tolyl and benzyl, and polyalkylene amines with the general formula $Y_2N(-Z-NY)_y-Y$, wherein Y is independently Q or H, wherein Q is defined as above, y is a whole number from 1 to 6, preferably 1 to 3, and Z is an alkylene group with 1 to 4, preferably 2 or 3 carbon atoms. Specific examples include methyl amine, dimethyl amine, trimethyl amine, ethyl amine, aniline, N-methyl aniline, diphenyl amine, triphenyl amine, toluidine, ethylene diamine, diethylene triamine.

Preferred β-dicarbonyl compounds are those with 4 to 12, in particular 5 to 8 carbon atoms, e.g., diketones, such as acetyl acetone, 2,3-hexanedione, 3,5-heptanedione, acetoacetic acid, aceto-acetic acid-$C_1$-$C_4$-alkyl ester, such as aceto-acetic acid ethyl ester, diacetyl, and acetonyl acetone.

Examples of amino aides include β-alanine, glycine, valine, amino caproic acid, leucine and isoleucine.

Preferred silanes have at least one non-hydrolizable group or a hydroxy group, and special preference goes to hydrolysable organosilanes, which additionally have at least one non-hydrolyzable residue. Preferred silanes have the general formula (I)

$$R_aSiX_{(4-a)} \tag{I}$$

wherein the residues R are the same or different, and represent non-hydrolyzable groups, the residues X are the same or different, and represent hydrolysable groups or hydroxy groups, and a has the value 1, 2 or 3. The value for a is preferably 1.

In general formula (I), the hydrolysable groups X, which can be the same or different, e.g., hydrogen or halogen (F, Cl, Br or I), alkoxy (preferably $C_{1-6}$-alkoxy, e.g., methoxy, ethoxy, n-propoxy and butoxy), aryloxy (preferably $C_{6-10}$-aryloxy, e.g., phenoxy), acyloxy (preferably $C_{1-6}$-acyloxy, e.g., acetoxy or propionyl oxy), alkyl carbonyl (preferably $C_{2-7}$-alkyl carbonyl, e.g., acetyl), amino, monoalkylamino or dialkylamino with preferably 1 to 12, in particular 1 to 6 carbon atoms. Preferred hydrolysable residues are halogen, alkoxy groups and acyl oxy groups. Particularly preferred hydrolysable residues are $C_{1-4}$-alkoxy groups, in particular methoxy and ethoxy.

The non-hydrolysable residues R, which can be the same or different, can be non-hydrolyzable residues R with or without a functional group.

The non-hydrolyzable residue R without a functional group can be alkyl (preferably $C_{1-6}$-alkyl, such as methyl, ethyl, n-propyl, isopropyl, n-butyl, sec.-butyl and tert.-butyl, pentyl, hexyl, octyl or cyclohexyl), alkenyl (preferably $C_{2-6}$-alkenyl, e.g., vinyl, 1-propenyl, 2-propenyl and butenyl), alkinyl (preferably $C_{2-6}$-alkinyl, e.g., acetylenyl and propargyl), aryl (preferably $C_{6-10}$-aryl, e.g., phenyl and naphthyl) as well as corresponding alkaryls and aralkyls (e.g., tolyl, benzyl and phenethyl). The residues R and X can each have one or more conventional substituents, as needed, e.g., halogen or alkoxy. Alkyl trialkoxy silanes are preferred. Examples include:

$CH_3SiCl_3$, $CHSi(OC_2H_5)_3$, $CH_3Si(OCH_3)_3$, $C_2H_5SiCl_3$, $C_2H_5Si(OC_2H_5)_3$, $C_2H_5Si(OCH_3)_3$, $C_3H_7Si(OC_2H_5)_3$, $(C_2H_5O)_3SiC_3H_6Cl$, $(CH_3)_2SiCl_2$, $(CH_3)_2Si(OC_2H_5)_2$, $(CH_3)_2Si(OH)_2$, $C_6H_5Si(OCH_3)_3$, $C_6H_5Si(OC_2H_5)_3$, $C_6H_5CH_2Si(OCH_3)_3$, $(C_6H_5)_2SiCl_2$, $(C_6H_5)_2Si(OC_2H_5)_2$, $(i-C_3H_7)_3SiOH$, $CH_2=CHSi(OOCCH_3)_3$, $CH_2=CHSiCl_3$, $CH_2=CH-Si(OC_2H_5)_3$, $CH_2=CHSi(OC_2H_5)_3$, $CH_2=CH-Si(OC_2H_4OCH_3)_3$, $CH_2=CH-CH_2-Si(OC_2H_5)_3$, $CH_2=CH-CH_2-Si(OC_2H_5)_3$, $CH_2=CH-CH_2-Si(OOCCH_3)_3$, $n-C_6H_{13}-CH_2-Ch_2-Si(OC_2H_5)_3$, and $n-C_8H_{17}-CH_2-CH_2-Si(OC_2H_5)_3$.

The non-hydrolyzable residue R with a functional group can encompass a functional group in the form of an epoxide (e.g., glycidyl or glycidyloxy), hydroxy, ether, amino, monoalkyl amino, dialkyl amino, if necessary, substituted anilino, amide, carboxy, acryl, acryloxy, methacryl, methacryloxy, mercapto, cyano, alkoxy, isocyanato, aldehyde, alkyl carbonyl, acid anhydride and phosphoric acid group. These functional groups are bound to the silicon atom via alkyklene, alkenylene or arylene bridge groups, which can be interrupted by oxygen or NH groups. The bridge groups preferably contain 1 to 18, preferably 1 to 8, and particularly 1 to 6 carbon atoms.

The mentioned bivalent bridge groups and any present substituents, as in the alkyl amino groups, are derived from the aforementioned univalent alkyl, alkenyl, aryl, alkaryl or aralkyl residues, for example. Naturally, the residue R can also encompass more than one functional group.

Preferred examples for non-hydrolyzable residues R with functional groups are a glycidyl or a glycidyloxy-($C_{1-20}$)-alkylene residue, such as β-glycidyloxyethyl, γ-glycidyloxypropyl, δ-glycidyloxybutyl, ε-glycidyloxypentyl, ω-glycidyloxyhexyl, and 2-(3,4-epoxycyclohexyl)ethyl, a (meth)acryloxy-($C_{1-6}$)-alkylene residue, e.g., (meth)acryloxymethyl, (meth)acryloxyethyl, (meth)acryloxypropyl or (meth)acryloxybutyl, and a 3-isocyanatopropyl residue. Particularly preferred residues are γ-glycidyloxypropyl and (meth)acryloxypropyl. ((Meth)acryl stands for methacryl or acryl).

Specific examples for corresponding silanes include γ-glycidyloxypropyl trimethoxy silane (GPTS), γ-glycidyloxypropyl dimethyl chlorosilane, 3-aminopropyl trimethoxy silane (APTS), 3-aminopropyl triethoxy silane (APTES), N-(2-aminoethyl)-3-aminopropyl trimethoxy silane, N-[N'-(2'-aminoethyl)-2-aminoethyl]-3-aminopropyl trimethoxy silane, hydroxymethyl trimethoxy silane, 2-[methoxy(polyethylenoxy)propyl]trimethoxy silane, bis-(hydroxyethyl)-3-amninopropyl triethoxy silane, N-hydroxyethyl-N-methylaminopropyl triethoxy silane, 3-(meth)acrylooxypropyl triethoxy silane and 3-(meth)acryloxypropyl trimethoxy silane.

Also possible is the use of silanes that at least partially exhibit organic residues, which are substituted with fluorine. WO 92/217298 describes such silanes in detail. These can be hydrolysable silanes with at least one non-hydrolyzable residue having the general formula $$Rf(R)_b SiX_{(3-b)} \qquad (II)$$

wherein X and R are as defined in formula (I), Rf is a non-hydrolyzable group having 1 to 30 fluorine atoms bound to carbon atoms, which are preferably separated from the Si by at least two atoms, preferably an ethylene group, and b is 0, 1 or 2. In particular, R is a residue without a functional group, preferably an alkyl group such as methyl or ethyl. The groups Rf preferably contain 3 to 25, an din particular 3 to 18, fluorine atoms, which are bound to carbon atoms. Rf is preferably a fluorinated alkyl group with 3 to 20 C atoms, with examples being $CF_3CH_2CH_2$, $C_2F_5CH_2CH_2$, $n-C_6F_{13}CH_2CH_2$, $i-C_3F_7OCH_2CH_2CH_2$, $n-C_8F_{17}CH_2CH_2$ and $n-C_{10}F_{21}-CH_2CH_2$.

Examples for usable fluorosilanes include $CF_3CH_2CH_2SiCl_2$ $(CH_3)$, $CF_3CH_2CH_2SiCl$ $(CH_3)_2$, $CF_3CH_2CH_2Si(CH_3)$ $(OCH_3)_2$, $C_2F_5CH_2CH_2-SiZ_3$, $n-C_6F_{13}CH_2CH_2SiZ_3$, $n-C_8F_{17}CH_2CH_2SiZ_3$, $n-C_{10}F_{21}-CH_2CH_2SiZ_3$ with $(Z=OCH_3, OC_2H_5$ or $Cl)$, $i-C_3F_7OCH_2CH_2CH_2SiCl_2(CH_3)$, $n-C_6F_{13}CH_2CH_2Si(OCH_2CH_3)_2$, $n-C_6F_{13}CH_2CH_2SiCl_2$ $(CH_3)$, and $n-C_6F_{13}CH_2CH_2SiCl$ $(CH_3)$.

The silanes can be manufactured according to known methods; see W. Noll, "Chemistry and Technology of Silicones", Verlag Chemie GmbH, Weinheim/Bargstraβe (1968).

Examples for metal compounds that have a functional group include metal compounds of a metal M from the primary groups III to V and/or the secondary groups II to IV of the periodic table of elements. Compounds of Al, Ti or Zr are preferred. Examples include $R_GMX_{4-c}$ (M=Ti or Zr and c=1, 2, 3), wherein X and R are defined as above in formula (I), wherein one R or several R's in conjunction can also stand for a complexing agent, e.g., a β-dicarbonyl compound or a (mono)carbonic acid. Zirconium and titanium tetraalcoholates are here preferred, in which ha portion of the alkoxy groups has been replaced by a complexing agent, e.g., a β-dicarbonyl compound or a carbonic acid, preferably a monocarbonic acid.

The substances used according to the invention can be mixed together in any sequence desired. Mixing can take place directly in the comminution machine, or beforehand in a separate container, e.g., a mixer. Otherwise, no further additives are preferably added, i.e., the mixture to be subjected to reactive comminution consists of at least one dispersant, at least one modifying agent, which can coincide with the dispersant in special instances, and the particles, which preferably are particles consisting of only a single material. Examples of additives that can be added as desired include antifoaming agent, pressing aid, organic binders, photocatalysts, preservatives and rheological additives. Additives need only be supplied if required for further processing. Therefore, these additives can also be supplied after processing according to the invention. One advantage to prior addition may lie in the homogeneous mixture obtained by milling.

During the execution of the method according to the invention, the content of particles depends heavily on the type of particle, but generally measures up to 60% v/v of the suspension, normally ranging between 50 and 0.5% v/v, preferably between 30 and 1% v/v, in particular between 25 and 2.5% v/v of the dispersion. The remaining suspension consists of dispersants and modifying agents. The weight ratio between the particles and modifying agents here generally measures 100:1 to 100:35, in particular 100:2 to 100:25, and especially preferred 100:4 to 100:20.

The quantity ratio of particles to milling elements present in the milling chamber is inevitably derived from the solid content of the suspension and the used fill level of milling balls and the bulk density of the milling balls.

Mechanical comminution generally takes place in mills, kneaders, cylinder mills or, for example, in high-velocity dispersers. Suitable comminution machines for mechanical comminution include homogenizers, turbo-agitators, mills with loose milling implements, such as ball, rod, drum, cone, tube, autogenous, planetary, vibration and agitating mills, heavy roller kneader, mortar mills, colloid mills and cylinder mills. Comminution, which can involve milling and homogenizing, preferably takes place at room temperature. The duration depends on the type of mixing, and the used comminution machine.

Mills with loose milling implements are preferably used. The milling implements or milling bodies can be balls, rods or short cylindrical pieces, for example. The container performs a rotating, planetary or agitating motion, for example, or the milling bodies are moved with an agitator.

Especially preferred mills are agitating ball mills with a moving agitator and milling balls as the milling bodies.

Mills with very small milling bodies are preferably used, which enables the application of small-dimensional shearing forces. The finest dispersing step is preferably performed using milling bodies having a diameter not exceeding 2.5 mm, preferably not exceeding 1.5 mm, and especially preferred not exceeding 1.0 mm, and measuring no less than 0.05 mm, preferably no less than 0.07 mm, and especially preferred no less than 0.09 mm. The milling bodies normally consist of steel, plastic, hard metal, $Al_2O_3$, agate, zirconium silicate, $ZrO_2$, $YZrO_2$, $Ce-ZrO_2$, glass, SiC, SiN or mixtures of these materials, wherein especially preferred milling body materials are stabilized zirconium oxides, zirconium silicate and steel.

Comminution can also take place in two or more stages. For example, it can involve a preceding comminution (pre-comminution) and subsequent finest comminution, wherein the modifying agents can be present in each stage or in at least one stage, e.g., the last one. For example, milling with milling bodies can be preceded by a milling step with coarser milling bodies to achieve the optimal, efficient initial particle size for the finest comminution step.

The preferred particle size (average diameter or average smallest dimension) for the finest comminution step measures 30 to 1,000 nm, preferably 50 to 500 nm, and especially preferred 60 to 150 nm.

Depending on the design of the used comminution machine, in particular of a mill, fill levels of 50 to 100% are used for milling bodies, for example, wherein fill levels preferably measure 60 to 98%, especially preferably 70 to 95%.

The comminution process in agitating ball mills takes place at agitator speeds of 900 to 5,000 RPM, for example, with speeds of 1,000 to 4,500 RPM being preferred, and speeds of 2,000-4,200 RPM being especially preferred.

The milling duration depends in particular on the type of used particles, and can last several minutes up to days, e.g., 10 minutes to 5 days, preferably between 1 hour and 12 hours.

Reactive comminution can be supported through additional energy supply (combined with the mechanical energy), e.g., microwave and/or ultrasound, wherein these two methods can also be used simultaneously. It is especially preferred to supply energy to the dispersion process directly in the comminution machine, but this can also take place outside of the comminution machine in the product circulation.

The method according to the invention is preferably carried out at room temperature (approx. 20° C.) up to the boiling point of the dispersing medium. Suitable temperature moderation (cooling) of the milling chamber of the mill makes it possible to set these corresponding operating temperatures.

The method can be used both continuously in the single-pass mode, multi-pass mode (oscillating process) or circular process, as well as continuously in the batch mode.

Reactive comminution according to the invention chemically binds the modifying agent to the comminuted particles. At least a portion of the used modifying agent molecules are here bound to the particles. The percentage that becomes chemically bound depends on the type of particles, the used quantity in relation to the particles, the obtained size, and hence the available particle surface.

Combining the use of modifying agents and mechanical comminution according to the invention makes it possible to generate functional colloids that have chemical compounds rigidly bound to the colloid particles. This enables the fabrication of colloid particles of a smallest dimension extending even as far down as 0.01 to 0.002 μm.

The average smallest dimension (average diameter, average height or width) of the particles manufactured in the method according to the invention must not exceed 0.2 μm, preferably not exceed 0.1 μm, and especially preferred not exceed 0.05 μm. If needed, comminution can even yield particles with an average smallest dimension not exceeding 0.01, and even one exceeding 0.002 μm.

The average smallest dimension is e.g. the average particle diameter for spherical particles, and the average height for plate-like particles. In this description, average particle diameter is understood to be the $d_{50}$ value of volume distribution. The expert is aware of methods for determining these particle sizes, along with details relating to these methods. Examples for suitable measuring procedures include dynamic laser light scattering (e.g., with an ultrafine particle analyzer (UPA)), X-ray disk centrifuging or quantitative image analysis of electron microscopic photographs.

If desired, functional colloid particles usable as powder can be obtained from the resultant functional colloid by removing the dispersant. Any method known to the expert can be used for removal purposes, e.g., evaporation, centrifugation or filtration. In another separation method, the expert uses known methods to set the isoelectric point in order to obtain a flocculation that can then be filtered out. The surface of the obtained functional colloid particles has the chemically bound modifying agent molecules, the functionality of which can be used to control the particle properties: The colloid particles can then be absorbed again in the same or another dispersant, wherein little or no aggregation takes place, so that the average particle diameter can essentially be retained.

The functional colloids or functional colloid particles can be further processed via methods known to the expert. For example, it can be reacted with other surface modifiers, dispersed in organic or aqueous solvents, and soluble polymers, oligomers or organic monomers or sols or additives, e.g., of the kind mentioned above, can be added. Such mixtures, preparations or the functional colloids or the very functional colloid particles according to the invention can be used to manufacture coatings or in other applications, for example.

Examples for the use of functional colloids, functional colloid particles or mixtures encompassing these functional colloids or functional colloid particles include the manufacture of ceramic moldings, films, membranes and coatings, or of polymer matrix compounds. The coatings or layers can be used for a wide variety of purposes, e.g., coatings with low-energy surfaces or abrasion-proof microbicides, photocatalytic, microstructurable or microstructured, holographic, conductive, UV-absorbing, photochromic and/or electrochromic layers.

The following examples serve to further illustrate this invention.

EXAMPLES

Examples 1 to 5 were performed with a mill (Drais Perl Mill PML-H/V). Specifications: Milling chamber gross volume: 1.2 l, agitator, milling chamber cladding and milling body separation (sieve cartridge) made of zirconium oxide, engine power main drive 4.0 kW, engine speed main drive 3,000 RPM, agitator speed 900-4,100 RPM.

Example 1

600 ml of toluene, 50 g of talcum powder (<10 microns, BET surface 14 $m^2/g$) and 5 g of methyl trimethoxy silane are placed in a reaction vessel and mixed for 30 minutes while stirring. The obtained mixture is filled into an agitating ball mill containing 1,300 g of milling balls (zirconium silicate, ball diameter 0.6-1.0 mm). Milling takes place at 4,000 RPM for 4 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 200 $m^2/g$.

Example 2

600 ml of toluene, 50 g of talcum powder (<10 microns, BET surface 14 $m^2/g$) and 7.2 g of phenyl trimethoxy silane are placed in a reaction vessel and mixed for 30 minutes while stirring. The obtained mixture is filled into an agitating ball mill containing 1,300 g of milling balls (zirconium silicate, ball diameter 0.6-1.0 mm). Milling takes place at 4,000 RPM for 4 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 194 $m^2/g$.

Example 3

600 ml of toluene, 50 g of talcum powder (<10 microns, BET surface 14 $m^2/g$) and 8.9 g of [methylacrylic acid-3-trimethoxysilylpropyl ester] are placed in a reaction vessel and mixed for 30 minutes while stirring. The obtained mixture is filled into an agitating ball mill containing 1,300 g of milling balls (zirconium silicate, ball diameter 0.6-1.0 mm). Milling takes place at –4,000 RPM for 4 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 153 $m^2/g$.

Example 4

600 ml of toluene, 50 g of talcum powder (<10 microns, BET surface 14 $m^2/g$) and 5 g of 2-[methoxy(polyethyleneoxy) propyl]trimethoxy silane are placed in a reaction vessel and mixed for 30 minutes while stirring. The obtained mixture is filled into an agitating ball mill containing 1,300 g of milling balls (zirconium silicate, ball diameter 0.6-1.0 mm). Milling takes place at 4,000 RPM for 4 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 101 $m^2/g$.

Comparative Example 600 ml of toluene and 50 g of talcum powder (<10 microns, BET surface 14 $m^2/g$) are placed in a reaction vessel and mixed for 30 minutes while stirring. The obtained mixture is filled into an agitating ball mill containing 1,300 g of milling balls (zirconium silicate, ball diameter 0.6-1.0 mm). Milling takes place at 4,000 RPM for 4 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 18 $m^2/g$.

Example 5

1,350 ml of toluene, 150 g of talcum powder (<10 microns, BET surface 14 $m^2/g$) and 15 g of methacrylic acid[3-trimethoxysilyl propyl ester] are placed in a reaction vessel and mixed for 30 minutes while stirring. The obtained mixture is continuously pumped by an agitating ball mill (Netzsch Lab-Star LS1) 90% filled with milling balls (zirconium oxide, ball diameter 0.4 mm). Milling takes place at 3,000 RPM for 2 hours. The mill is then evacuated with 2 l of toluene. The solvent is removed via centrifugation (4,000 RPM, 15 min). The remaining powder is dried at 130° C. for 24 hours in a vacuum drying cabinet, and has a BET surface of 180 $m^2/g$.

Example 6

1,000 ml of distilled water, 400 g of zirconium oxide (BET surface 150±10 $m^2/g$) and 60 g of 3,6,9-trioxadecanic acid are placed in a reaction vessel and mixed for 30 minutes while stirring. The obtained mixture is milled in an agitating ball mill for 4 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). The colloid obtained in this way contains particles with an average particle diameter of $d_{50}$=0.0118 μm (UPA).

Example 7

880 ml of distilled water, 800 g of zirconium oxide (BET surface 150±10 $m^2/g$) and 120 g of 3,6,9-trioxadecanic acid are placed in a reaction vessel and mixed for 30 minutes while stirring. The obtained mixture is milled in an agitating ball mill for 4.5 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). The colloid obtained in this way contains particles with an average particle diameter of $d_{50}$=0.0123 μm (UPA).

Example 8

150 ml of distilled water, 1,500 ml of i-propanol, 800 mg of zirconium oxide (BET surface 150±10 $m^2/g$) and 40 g of 3,6,9-trioxadecanic acid and 38.6 g of methacrylic acid are placed in a reaction vessel and mixed for 30 minutes while stirring. The obtained mixture is milled in an agitating ball mill for 4.5 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). The colloid obtained in this way contains particles with an average particle diameter of $d_{50}$=0.0110 μm (UPA).

Example 9

800 ml of distilled water, 400 g of zirconium oxide (Degussa, $ZrO_2$-VP, BET surface 40±10 m²/g (per manufacturer), washed powder) and 60 g of 3,6,9-trioxadecanic acid are placed in a reaction vessel and mixed for 30 minutes while stirring. The obtained mixture is milled in an agitating ball mill for 4.5 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). The colloid obtained in this way contains particles with an average particle diameter of $d_{50}$=0.023 μm (UPA), BET surface 75 m²/g.

Example 10

800 ml of distilled water, 400 g of zirconium oxide (Tosoh, $ZrO_2$/TZ-O, BET surface 14 m²/g (per manufacturer)), and 60 g of 3,6,9-trioxadecanic acid are placed in a reaction vessel and mixed for 30 minutes while stirring. The obtained mixture is milled in an agitating ball mill (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). The colloid obtained in this way contains particles with an average particle diameter of $d_{50}$=0.073 μm (UPA), BET surface 48 m²/g.

Example 11

1,180 ml of distilled water, 800 g of aluminum oxide (Sumitomo, AKP53, BET surface 9-15 m²/g (per manufacturer)), and 60 g of 3,6,9-trioxadecanic acid are placed in a reaction vessel and mixed for 14 hours while stirring. The obtained mixture is milled in an agitating ball mill for 12 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). 20 g of 3,6,9-trioxadecanic acid are added after 4 and 5.5 hours, respectively. The colloid obtained in this way has a BET surface of 54 m²/g, $d_{50}$=0.044 μm (X-ray disk centrifuge).

Example 12

1,035 ml of ethanol, 201 g of titanium dioxide (Sachtleben, Hombitec RM300, BET surface 60 m²/g (per manufacturer), washed powder), 20.16 g of APTES and 4.8 ml of distilled water are placed in a reaction vessel and mixed for 5 minutes while stirring. The obtained mixture is milled in an agitating ball mill for 4 hours (Drais Perl Mill PML-H/V, zirconium oxide milling chamber cladding, milling chamber volume gross 1.2 l, 4,100 RPM, 1,700 g milling balls, zirconium silicate, ball diameter 0.3-0.4 mm, continuous operation in circular mode). Subsequent solvent replacement via centrifugation and twofold washing with distilled water (pH=7) yields a colloid with an average particle diameter of $d_{50}$=0.063 μm (UPA), BET surface 99 m²/g, after redispersion in water with pH 4.5.

The invention claimed is:

1. A method for the chemomechanical manufacture of a functional colloid, comprising subjecting particles to mechanical reactive comminution in a dispersant in the presence of a modifying agent,
   wherein comminution is conducted in an agitating mill having a moving agitator with loose milling bodies for reactive comminution of the particles, and wherein the milling bodies have a diameter not to exceed 2.5 mm,
   wherein the modifying agent is at least partially chemically bound to comminuted colloid particles, wherein a chemical bond between the modifying agent and the comminuted colloid particles is selected from the group consisting of covalent, ionic and coordinative bonds, wherein the modifying agent has a molecular weight not to exceed 500, and
   wherein the formed colloid particles have an average smallest dimension not to exceed 0.2 μm.

2. The method for the chemomechanical manufacture of a functional colloid according to claim 1, wherein the modifying agent in the dispersant exhibits no surfactant properties.

3. The method for the chemomechanical manufacture of a functional colloid according to claim 1, wherein the modifying agent also functions as the dispersant.

4. The method for the chemomechanical manufacture of a functional colloid according to claim 1, wherein reactive comminution is provided by an additional supply of energy to the dispersion, wherein the additional energy is supplied directly in the comminution machine.

5. The method for the chemomechanical manufacture of a functional colloid according to claim 1, wherein reactive comminution is provided by an additional supply of energy to the dispersion, wherein the additional energy is supplied directly outside the comminution machine.

6. The method for the chemomechanical manufacture of a functional colloid according to claim 5, wherein the additional energy supply takes place via ultrasound and/or microwaves.

7. The method for the chemomechanical manufacture of a functional colloid according to claim 4, wherein the additional energy supply takes place via ultrasound and/or microwaves.

8. The method for the chemomechanical manufacture of a functional colloid, wherein the functional colloid is manufactured according to the method of claim 1, and, thereafter, removing the dispersant.

9. The method for the chemomechanical manufacture of a functional colloid according to claim 1, wherein the particles are inorganic particles.

10. A method for the chemomechanical manufacture of a functional colloid, comprising subjecting particles to mechanical reactive comminution in a dispersant in the presence of a modifying agent,
    wherein comminution is conducted in an agitating mill having a moving agitator with loose milling bodies for reactive comminution of the particles, and wherein the milling bodies have a diameter not to exceed 2.5 mm,
    wherein the modifying agent is at least partially chemically bound to comminuted colloid particles, wherein a chemical bond between the modifying agent and the comminuted colloid particles is selected from the group consisting of covalent, ionic and coordinative bonds, and
    wherein the formed colloid particles have an average smallest dimension not to exceed 0.2 μm, wherein the modifying agent is selected from the group consisting of a silane, a carbonic acid, an aminocarbonic acid, an amine and mixtures thereof and has a molecular weight not to exceed 500.

* * * * *